United States Patent
Stollnitz et al.

(10) Patent No.: US 7,170,516 B2
(45) Date of Patent: *Jan. 30, 2007

(54) APPROXIMATION OF CATMULL-CLARK SUBDIVISION SURFACES BY BEZIER PATCHES

(75) Inventors: Eric Joel Stollnitz, Seattle, WA (US); Richard Everett Rice, Seattle, WA (US)

(73) Assignee: Autodesk, Inc., San Rafael, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/063,880

(22) Filed: Feb. 23, 2005

(65) Prior Publication Data

US 2005/0168464 A1    Aug. 4, 2005

Related U.S. Application Data

(63) Continuation of application No. 10/185,750, filed on Jul. 1, 2002, now Pat. No. 6,950,099.

(51) Int. Cl.
*G06T 17/20* (2006.01)

(52) U.S. Cl. ...................... 345/423; 345/442

(58) Field of Classification Search ............... 345/419, 345/420, 421, 422, 423, 424, 426, 427, 428, 345/441, 473, 474, 475
See application file for complete search history.

(56) References Cited

U.S. PATENT DOCUMENTS

| | | | |
|---|---|---|---|
| 5,999,188 A * | 12/1999 | Kumar et al. ............... 345/423 |
| 6,208,360 B1 * | 3/2001 | Doi et al. ................... 345/474 |
| 6,389,154 B1 | 5/2002 | Stam |
| 6,476,804 B1 * | 11/2002 | Costabel ..................... 345/419 |
| 6,801,654 B2 * | 10/2004 | Nakamura et al. .......... 382/154 |
| 6,856,312 B1 * | 2/2005 | Imai et al. .................. 345/419 |
| 6,950,099 B2 * | 9/2005 | Stollnitz et al. ............ 345/423 |
| 2002/0036639 A1 * | 3/2002 | Bourges-Sevenier ........ 345/474 |
| 2003/0034971 A1 * | 2/2003 | Fujiwara et al. ............ 345/420 |

OTHER PUBLICATIONS

Article "Subdivison Surface Theory" by Brian Sharp, Gamasutra, Apr. 11, 2000, pp. 1-13, URL: http://www.gamasutra.com/features/20000411/sharp_01.htm.*
Article "C2 subdivision over triangulations with one extraordinary point" by Avi Zulti, Adi Levin, David Levin and Mina Teicher, Department of Mathematics and Statistics, Bar-Ilan University, Ramat-Gan 52900, Israel, Jun. 5, 2005.*
Article "A novel FEM-based dynamic framework for subdivision surfaces" by C Mandal, H Qin, BC Vemuri, Symposium on Solid Modeling and Applications, 1999, pp. 191-201.*

(Continued)

*Primary Examiner*—Mark Zimmerman
*Assistant Examiner*—Enrique L. Santiago
(74) *Attorney, Agent, or Firm*—Staas & Halsey LLP (57) ABSTRACT

A method for converting a subdivision surface, such as a Catmull-Clark subdivision surface, into a cubic Bezier surface defined by sixteen control points. The method includes (a) converting a subdivision face to Bezier control points using a conversion matrix using fifteen points and a dummy value for an unavailable sixteenth point; and (b) replacing one of the Bezier control points which corresponds to an extraordinary point on the subdivision face with the extraordinary point's limit point.

2 Claims, 7 Drawing Sheets

OTHER PUBLICATIONS

U.S. Appl. No. 10/185,750, filed Jul. 1, 2002, Stollnitz et al., Alias Systems Corp.

Bartels, et al. "An Introduction to Splines For Use In Computer Graphics and Geometric Modeling." 1987. pp. 243-245.

E. Catmull, et al. "Recursively Generated B-Spline Surfaces on Arbitrary Topological Meshes." 1978. pp. 350-355.

Jos Stam. "Exact Evaluation of Catmull-Clark Subdivision Surfaces At Arbitrary Parameter Values." Alias/Wavefront, Inc.

* cited by examiner

FIG. 7

APPROXIMATION OF CATMULL-CLARK SUBDIVISION SURFACES BY BEZIER PATCHES

CROSS REFERENCE TO RELATED APPLICATIONS

This application is a continuation of application Ser. No. 10/185,750 filed Jul. 1, 2002, now U.S. Pat. No. 6,950,099.

BACKGROUND OF THE INVENTION

1. Field of the Invention

The present invention is directed to approximating a Catmull Clark subdivision surface by Bezier patches.

2. Description of the Related Art

Subdivision surfaces are a known computer graphics-modeling tool. Subdivision surfaces are powerful representations because they combine the best features of polygonal meshes (arbitrary topology) and NURBS surfaces (smoothness), in a mathematically elegant formulation. A subdivision surface base mesh is iteratively divided according to subdivision rules into a resultant limit surface, which is typically smooth. Catmull Clark is a widely used subdivision surface scheme which provides rules on how surfaces are subdivided. Subdivision surfaces, including Catmull Clark subdivision surfaces, can be found in commercial packages such as MAYA and SPEEDFORM. For an explanation of Catmull-Clark subdivision surfaces, please see the original paper by E. Catmull, J. Clark, "Recursively Generated B-Spline Surfaces on Arbitrary Topological Meshes," in Computer Aided Design 10, 6 1978).

Subdivision surfaces are expensive to evaluate near extraordinary vertices, making them slow to tessellate and draw. Additionally, there are several mathematical calculations whose solutions are well known for polygons and NURBS, but are not that easily solved for subdivision surfaces. Such calculations include intersecting a ray and a surfaces, intersecting a plane and a surface, intersecting two surfaces, and finding a point on a surface closest to a given point.

Other representations, such as Bezier patches, can more easily solve the above matters. Thus, it can be desirable to convert a subdivision face into a cubic Bezier patch. A cubic Bezier patch is defined by 16 three-dimensional control points.

The prior art teaches how to convert from a uniform cubic B-spline curve segment into a Bezier representation, as described in the book, An Introduction to Splines for Use in Computer Modeling, Bartels, Beatty, Barsky, pgs. 243–245. Vertices from a subdivision face may be substituted into the equations described in Bartels to convert it to a Bezier representation. However, the Bartels method only works where all vertices in the subdivision face are regular. In other words, the vertices are all of valence four (defined as having exactly four edges) and are not part of a crease. One possible definition of a crease is where the tangent plane of a surface changes on one side of the crease compared to the other side of the crease.

The prior art does not teach a method for converting an irregular subdivision face.

SUMMARY OF THE INVENTION

It is an aspect of the present invention to provide a method, apparatus, and computer readable storage for converting or approximating a subdivision face into cubic Bezier surface.

The above aspects can be attained by a system that (a) converts a subdivision face to Bezier control points using a conversion matrix using fifteen points and a dummy value for an unavailable sixteenth point; and (b) replaces one of the Bezier control points which corresponds to an extraordinary point on the subdivision face with the extraordinary point's limit point.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

The present invention allows conversion of a subdivision surface, such as a Catmull-Clark subdivision surface, into a cubic Bezier surface defined by sixteen control points. The present invention allows for conversion of a subdivision surface containing either an extraordinary point or a creased edge.

Figure 1:
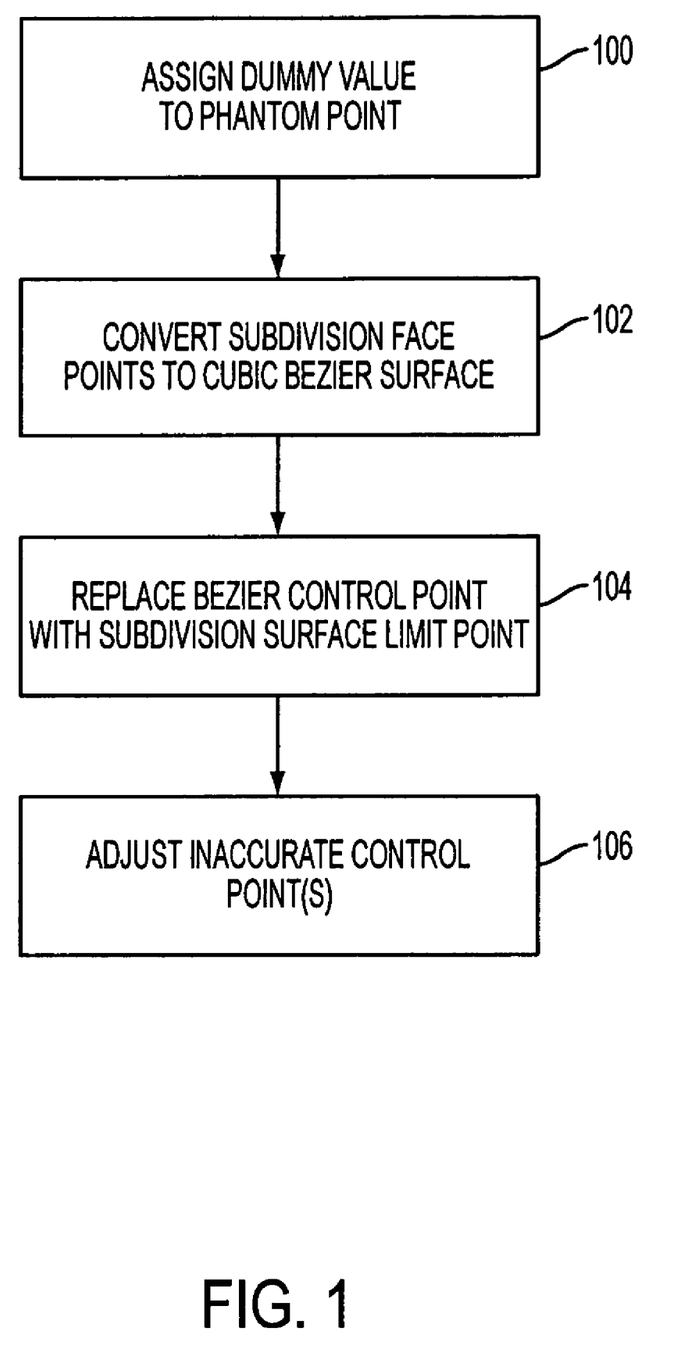
FIG. 1 is a flowchart illustrating a method of the present invention, according to an embodiment of the present invention.

FIG. 1 is a flowchart illustrating a method of the present invention, according to an embodiment of the present invention.

The method assigns 100 a dummy value to a phantom point. A phantom point is a point that is needed in the conversion matrix but is not really known. Since this value is not known, a dummy value (such as 0,0,0) is used. This operation is performed so that the conversion matrix (described in more detail below) can be used even though a value is not known. This operation will be described below in more detail.

The method then converts 102 the sixteen points which define the subdivision face (including the dummy value) using a conversion matrix into a cubic Bezier surface. However, since a dummy value was used for the phantom point, some of the resulting sixteen control points which define a cubic Bezier surface are not accurate (see the matrix formulas below). This operation will be described below in more detail.

The method then replaces 104 an appropriate Bezier control point with the subdivision surface limit point. This is done because using the phantom point in the matrix will cause a corresponding Bezier control point to be inaccurate. It is fixed by thus replacing it with the subdivision surface limit point. This operation will be described in more detail below.

The method then adjusts 106 the remaining control point(s) which are inaccurate. This adjusting more closely approximates the newly calculated cubic Bezier surface to more closely match the resultant limit surface of the original subdivision surface face. This operation will be described in more detail below.

Thus, the general operations described above can convert a subdivision surface, such as a Catmull-Clark subdivision surface, into a cubic Bezier surface, even if a face of the subdivision surface contains either an extraordinary point or a creased edge. The general operations described above will be described below in more detail.

Figure 2:
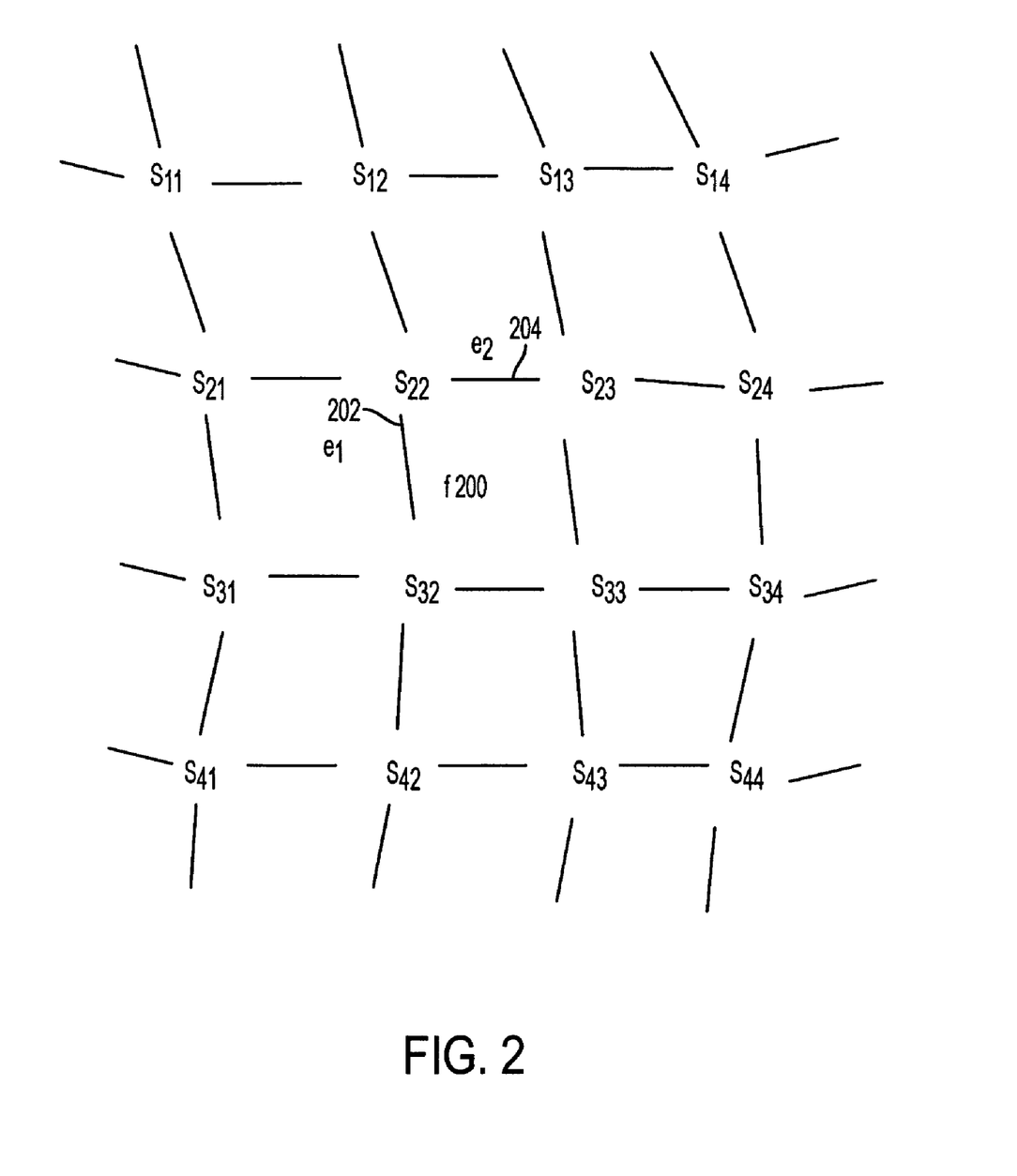
FIG. 2 is a drawing illustrating subdivision faces, according to an embodiment of the present invention.

FIG. 2 is a drawing illustrating subdivision faces, according to an embodiment of the present invention.

Given a quadrilateral face f 200 of a Catmull-Clark subdivision surface, the following method generates sixteen control points that define a cubic Bezier surface approximating the face.

Assume that the control mesh of the subdivision surface is sufficiently subdivided so that every face is a quadrilateral, every face has at most one extraordinary vertex. Also assume sufficient subdivision to guarantee that in a face with creased edges, the creased edges are incident to the extraordinary vertex, if one exists. These assumptions ensure that the face can be rotated until the extraordinary vertex (if it exists) is the upper-left corner of the face and only the left edge e1 202 and upper edge 204 e2 may be creased.

Traverse the control mesh edges to find all the neighboring vertices of the four corner vertices. If all the vertices are regular (valence four), there are a total of sixteen control vertices in the neighborhood of face 200.

Figure 3:
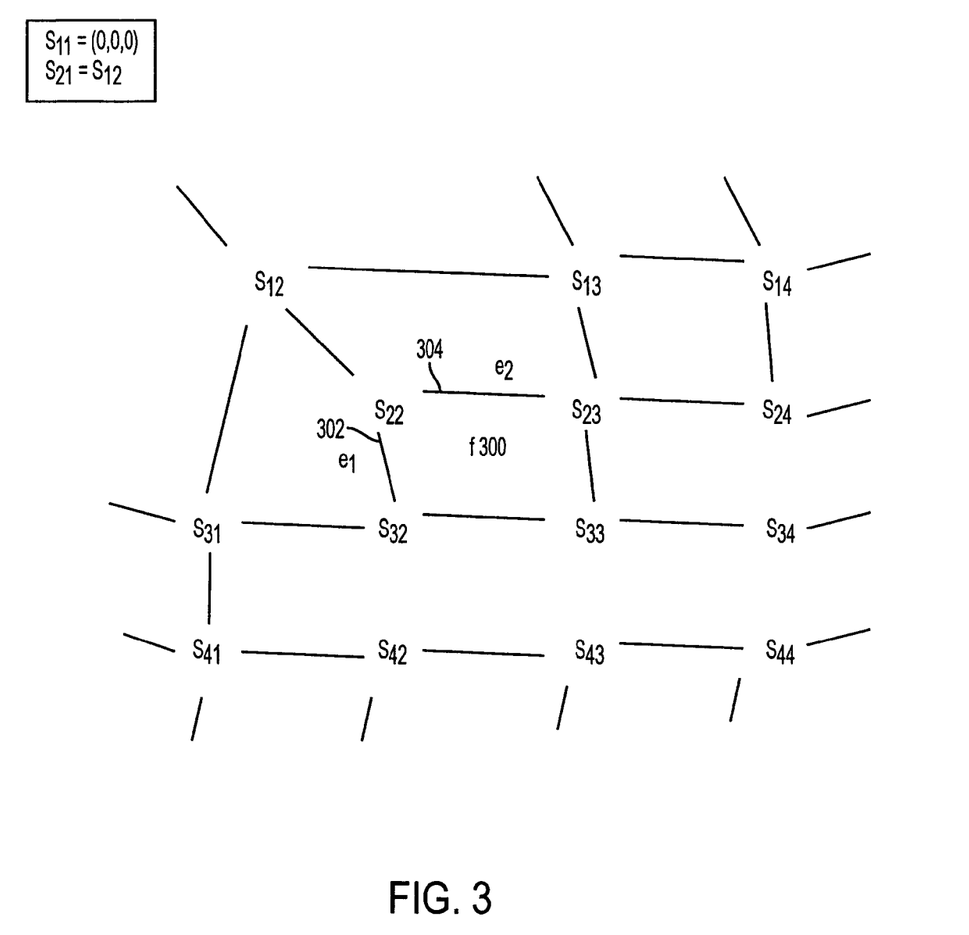
FIG. 3 is a drawing illustrating a subdivision face with a valence of three, according to an embodiment of the present invention.

FIG. 3 is a drawing illustrating a subdivision face with a valence of three, according to an embodiment of the present invention. If the upper-left corner of face f 300 is an extraordinary vertex with valence three, label the fourteen vertices in the neighborhood as in FIG. 3, setting $s_{21}=s_{12}$ and assigning $s_{11}=(0, 0, 0)$. Left edge e1 302 and upper edge e2 304 are also illustrated.

Figure 4:
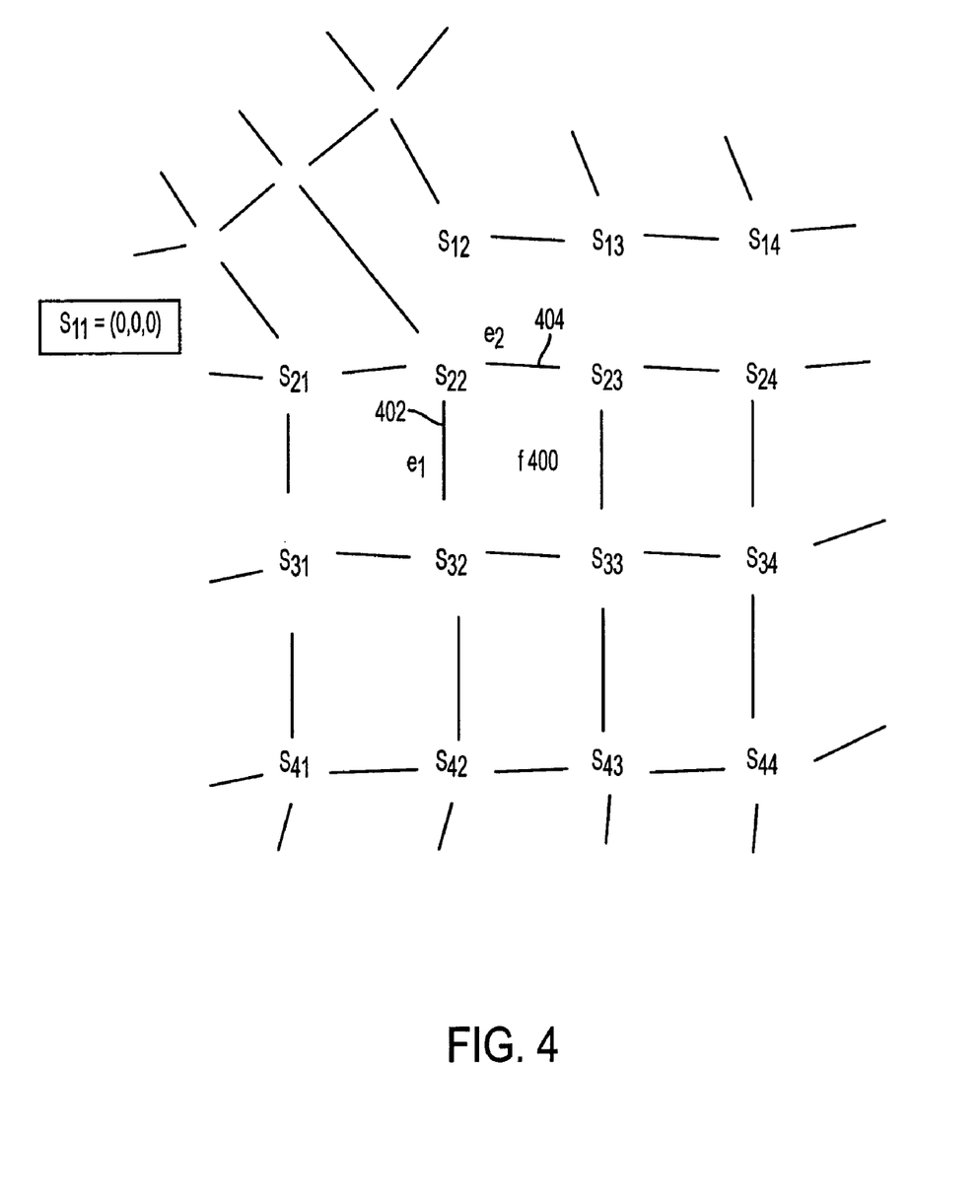
FIG. 4 is a drawing illustrating a subdivision face with a valence greater than four, according to an embodiment of the present invention.

FIG. 4 is a drawing illustrating a subdivision face with a valence greater than four, according to an embodiment of the present invention. If the upper-left corner of face f 400 has valence greater than four, label the vertices in the neighborhood as in FIG. 4, assigning $s_{11}=(0, 0, 0)$. Left edge e1 402 upper edge e2 404 are also illustrated.

Arranged the sixteen control vertices $s_{11}$ through $s_{44}$ in a four-by-four matrix S:

$$S = \begin{bmatrix} s_{11} & s_{12} & s_{13} & s_{14} \\ s_{21} & s_{22} & s_{23} & s_{24} \\ s_{31} & s_{32} & s_{33} & s_{34} \\ s_{41} & s_{42} & s_{43} & s_{44} \end{bmatrix}$$

Multiply S on the left by matrix $M_1$ and on the right by the transpose of matrix $M_2$ to convert spline control points to Bezier control points B:

$$B = M_1 S (M_2)^T$$

Use $M_1 = M_{creased}$ if the left edge of the face is creased and $M_1 = M_{uncreased}$ otherwise. Similarly, use $M_2 = M_{creased}$ if the upper edge of the face is creased and $M_2 = M_{uncreased}$ otherwise. The matrix $M_{uncreased}$ is the standard spline-to-Bezier conversion matrix:

$$M_{uncreased} = 1/6 \begin{bmatrix} 1 & 4 & 1 & 0 \\ 0 & 4 & 2 & 0 \\ 0 & 2 & 4 & 0 \\ 0 & 1 & 4 & 1 \end{bmatrix}$$

The matrix $M_{creased}$ except for the first row:

$$M_{creased} = 1/6 \begin{bmatrix} 0 & 6 & 0 & 0 \\ 0 & 4 & 2 & 0 \\ 0 & 2 & 4 & 0 \\ 0 & 1 & 4 & 1 \end{bmatrix}$$

If the upper-left corner of face f is an extraordinary vertex or is the endpoint of any creased edges, correct the upper-left Bezier control point $b_{11}$ by setting it to the subdivision surface limit point corresponding to the upper-left corner vertex of face f.

If the upper-left corner of face f is an extraordinary vertex with no incident crease edges, correct the Bezier control point $b_{21}$ as follows:

a) Calculate the partial derivative of the subdivision surface at the extraordinary point in the direction of edge $e_1$, using Stam's exact evaluation technique. (See Exact Evaluation of Catmull-Clark Subdivision Surfaces at Arbitrary Parameter Values, Jos Stam, Proceedings of SIGGRAPH 98. pp. 395–404, 1998.) This gives a direction $d_1$ that is tangent to the surface at the extraordinary point, radiating in the direction of edge $e_1$ from the extraordinary point.

b) Calculate the limit point $p_1$ corresponding to the point halfway along edge $e_1$, again using Stam's exact evaluation technique.

c) Compute $q_1 = (8p_1 - 4b_{11} - 3b_{31} - b_{41})/3$.

d) Use the method of least squares to find the best solution $x_1$ to the three equations in one variable expressed by the system $d_1 x_1 = q_1$. The unique solution is given by $x_1 = (d_1 q_1)/(d_1 d_1)$.

e) Set $b_{21} = b_{11} + d_1 x_1$. This construction forces the tangent direction along the edge of the Bezier surface to match the tangent direction $d_1$ along the edge of the subdivision surface face, while ensuring the edge of the Bezier surface comes as close as possible to passing through the point $p_1$.

If the upper-left corner of face f is an extraordinary vertex with no incident crease edges, correct the Bezier control point $b_{12}$ using the same technique describe above for the case if the upper-left corner of face f is an extraordinary vertex with no incident crease edges, but this time using edge $e_2$ and Bezier control points $b_{11}$, $b_{13}$, and $b_{14}$.

The surface approximating the original subdivision surface face is given by the standard formula for a cubic Bezier surface:

$$a(u,v) = \begin{bmatrix} (1-u)^3 \\ 3u(1-u)^2 \\ 3u^2(1-u) \\ u^3 \end{bmatrix}^T \begin{bmatrix} b_{11} & b_{12} & b_{13} & b_{14} \\ b_{21} & b_{22} & b_{23} & b_{24} \\ b_{31} & b_{32} & b_{33} & b_{34} \\ b_{41} & b_{42} & b_{43} & b_{44} \end{bmatrix} \begin{bmatrix} (1-v)^3 \\ 3v(1-v)^2 \\ 3v^2(1-v) \\ v^3 \end{bmatrix}$$

Figure 5:
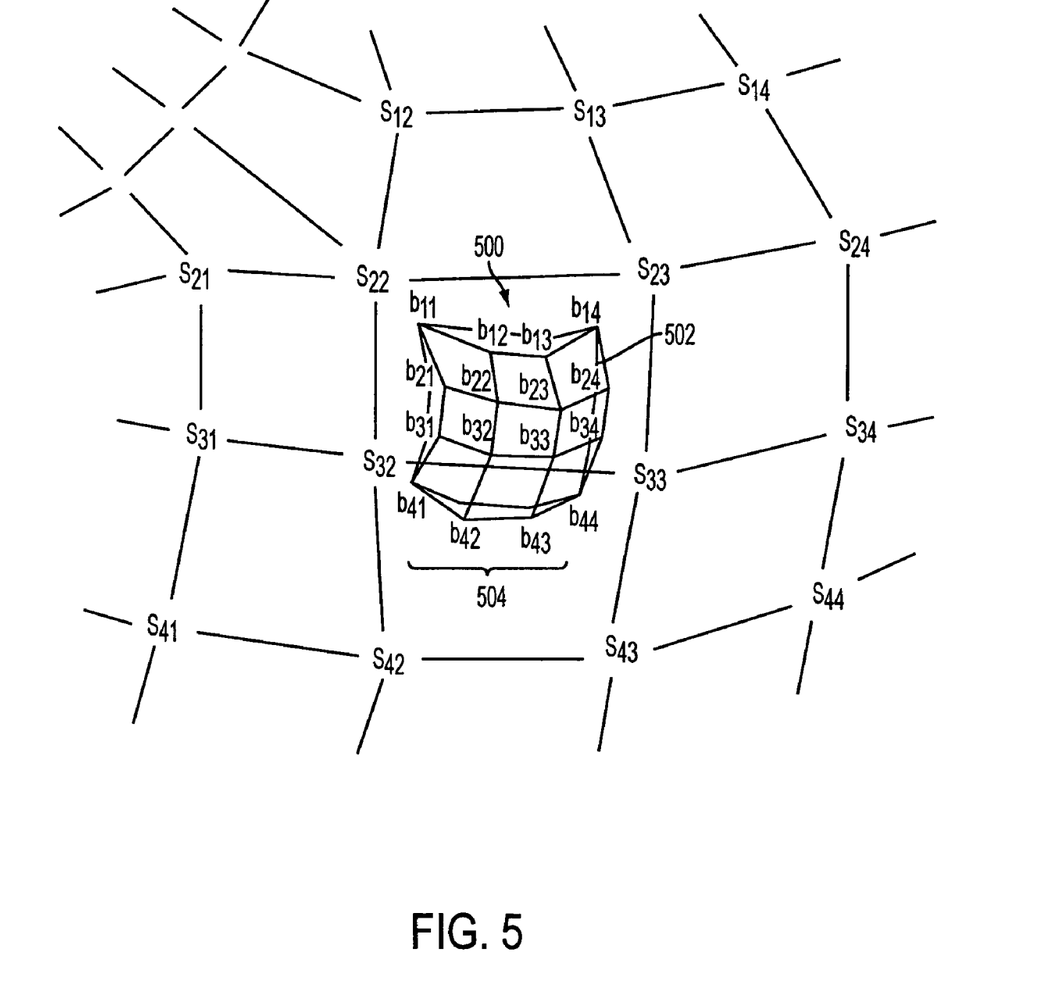
FIG. 5 is a drawing illustrating a subdivision face, the subdivision face's resulting limit surface, and the face's converted Bezier patch, according to an embodiment of the present invention.

FIG. 5 is a drawing illustrating a subdivision face, the subdivision face's resulting limit surface, and the face's converted Bezier patch, according to an embodiment of the present invention.

Subdivision face 500 has a limit surface 504. Control points $b_{11}, b_{12}, b_{13}, b_{14}, b_{21}, b_{22}, b_{23}, b_{24}, b_{31}, b_{32}, b_{33}, b_{34}, b_{41}, b_{42}, b_{43}, b_{44}$, define Bezier patch 504, after performing the conversion using the methods described above. Bezier patch 504 should closely match limit surface 504, although in FIG. 5 it may not appear this way so as to better illustrate the two surfaces.

Figure 6:
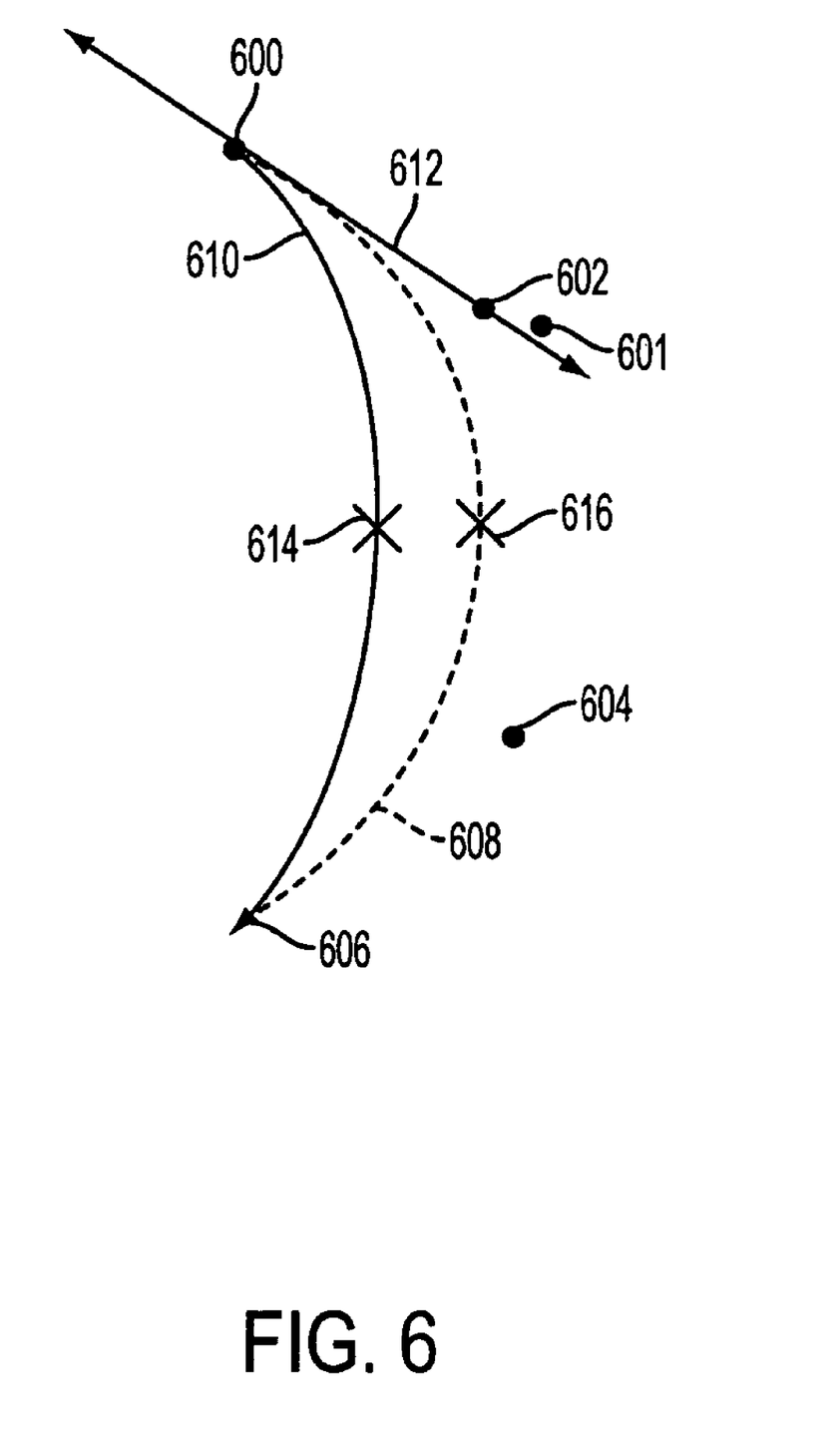
FIG. 6 is a drawing illustrating adjusting of a control vertex, according to an embodiment of the present invention.

FIG. 6 is a drawing illustrating adjusting of a control vertex, according to an embodiment of the present invention.

Bezier control points 600, 601, 604, and 606, are four side Bezier points (of the resulting sixteen points) after applying the conversion discussed above. Control points 600, 601, 604, 606, define Bezier surface 608, which is one side of the entire Bezier patch (the remaining sides are not pictured) defined by the sixteen control points that we have previously computed. Subdivision limit surface 610 is the limit surface of the original subdivision face. Note that the conversion to a Bezier patch is an approximation and thus Bezier surface 608 does not exactly match subdivision limit surface 610. The inaccuracy stems from using the dummy value in the matrix and substituting a subdivision limit point for an extraordinary point.

Control points 600 and 606 lie on the original subdivision limit surface 610. However, control points 601 and 604 typically do not. One (or more) of these points can be adjusted to improve the fit of the Bezier surface 608 with the subdivision limit surface 610.

Control point 601 can be adjusted to better match the Bezier surface 608 to the subdivision limit surface 610. To do this, a tangent ray 612 tangent to the limit surface 610 at the extraordinary point is calculated as described above. In this example the extraordinary point corresponds to control point 600, but of course in different situations the extraordinary point could be in a different position.

Bezier surface fit point 614 is identified. One possible way this can be done is to identify a point halfway on the Bezier surface 608, although any other criteria can be used. Subdivision limit surface fit point 616 is identified as a point halfway along the subdivision limit surface 610. This point can also be known as the mid parameter point.

Control point 601 is then replaced by sliding an adjusted point 602 along the tangent ray 612 so that the Bezier surface fit point 614 and the subdivision limit surface fit point 616 collide. One way this can be computed is performing a conventional least squares matrix calculation to match Bezier surface fit point 614 and subdivision limit surface fit point 616, given control points 600, 604, and 606, and tangent ray 612. Thus, Bezier control points 600, 602, 604, and 606 are the final results of our conversion. The adjusted Bezier surface (not illustrated) resulting from control points 600, 602, 604, and 606 results in a better fit than the original Bezier surface 608 (made from control points, 600, 601, 604, and 606).

While the above example applies to the left side of the Bezier patch, the same adjusting can be applied to the top side or any side of the Bezier patch affected by the approximations. If the extraordinary point falls on the upper left of the original subdivision face, then the left side and top side of the converted Bezier patch will need adjusting. Further, note that the points, lines, and surfaces illustrated in FIG. 6 are illustrated for clarity and generalization, but may not be mathematically exact.

Figure 7:
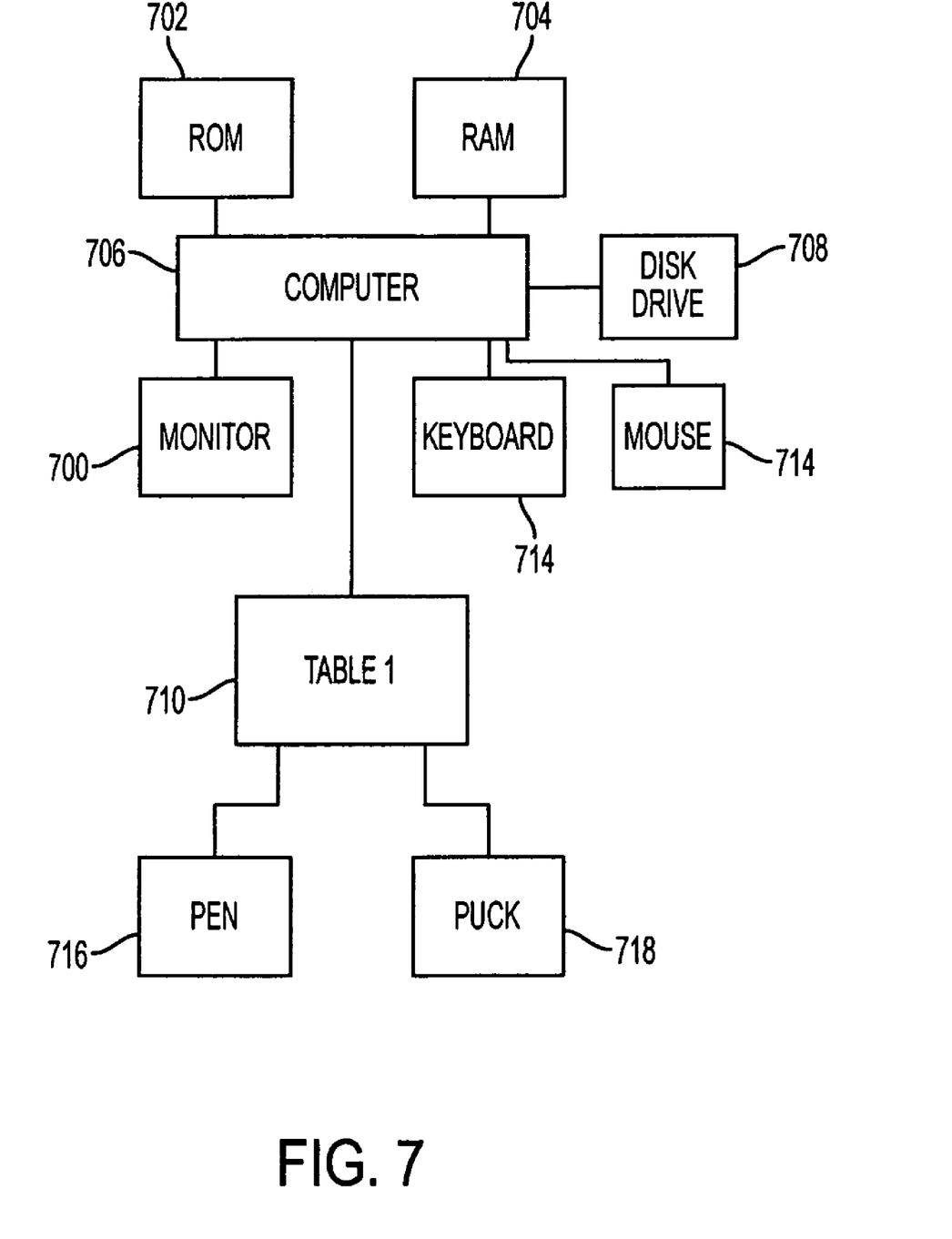
FIG. 7 is a block diagram illustrating one example of hardware used to implement the present invention, according to an embodiment of the present invention.

FIG. 7 is a block diagram illustrating one example of hardware used to implement the present invention, according to an embodiment of the present invention.

Computer 706 contains a ROM 702, a RAM 704, and a disk drive 708. Computer 706 is also connected to a display monitor 700. Computer 706 is connected to a keyboard 712 and a mouse 714. Computer 706 can also be connected to such input devices as a tablet 710, which may include a pen 716 and a puck 718.

The present invention has been described with respect to converting a subdivision surface containing either an extraordinary point or a creased edge to a cubic Bezier surface.

The methods described above can all be performed manually by a person. The methods can also be performed by a computer program which can be stored on any type of computer readable storage medium, for example a CD-ROM. Further, the present invention provides for an apparatus (such as a digital computer) which is capable of executing a program which performs the methods herein.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method, comprising:
   converting a subdivision face of a computer based model containing an extraordinary point to a Bezier patch of the model defined by Bezier control points; and
   adjusting a Bezier control point to improve the conversion and displaying the patch.

2. A method, comprising:
   converting a subdivision face of a computer based model with a creased edge to a Bezier patch of the model defined by Bezier control points; and
   adjusting a Bezier control point to improve the conversion and displaying the patch.

* * * * *

UNITED STATES PATENT AND TRADEMARK OFFICE
CERTIFICATE OF CORRECTION

PATENT NO.         : 7,170,516 B2
APPLICATION NO. : 11/063880
DATED              : January 30, 2007
INVENTOR(S)        : Eric Stollnitz et al.

It is certified that error appears in the above-identified patent and that said Letters Patent is hereby corrected as shown below:

Column 3, Line 52, after "el 402" insert --and --.

Column 3, Line 54, change "Arranged" to --Arrange--.

Column 4, Line 15, after "$M_{creased}$" insert --is the same--.

Column 6, Line 56, after "points;" delete "and".

Signed and Sealed this

Eighth Day of May, 2007

JON W. DUDAS
*Director of the United States Patent and Trademark Office*